United States Patent [19]
Jones et al.

[11] Patent Number: 5,596,507
[45] Date of Patent: Jan. 21, 1997

[54] METHOD AND APPARATUS FOR PREDICTIVE MAINTENANCE OF HVACR SYSTEMS

[76] Inventors: Jeffrey K. Jones, 1861 SE. 148th Ave., Portland, Oreg. 97233; James White, 2233 SE. 53, Portland, Oreg. 97215

[21] Appl. No.: 290,358

[22] Filed: Aug. 15, 1994

[51] Int. Cl.$^6$ ................................................. G06F 17/00
[52] U.S. Cl. .................................. 364/505; 364/551.01
[58] Field of Search ................................ 364/505, 500, 364/551.01, 274.2, 274.3, 274.5, 276.4; 395/50, 51, 904

[56] References Cited

U.S. PATENT DOCUMENTS

| | | | |
|---|---|---|---|
| 4,985,857 | 1/1991 | Bajpai et al. | 364/551.01 |
| 5,311,562 | 5/1994 | Palusamy et al. | 364/500 X |
| 5,355,444 | 10/1994 | Chirico | 395/51 |

OTHER PUBLICATIONS

Krieder, et al. "Expert Systems, Neural Networks And Artificial Intelligence In Commerical Building HVAC Operations" Automation In Construction v. 1, n. 3 (1992) pp. 225–238.

Bourdeau et al. "Computer Aided System For Breakdown Diagnosis and Repairing Assistance of HVAC Components" 2nd Finnish–French Colloqium For Information Technology v. 118 1990 pp. 153–158.

"Service Tech Develops Predictive Maintenance Program", Leonard Ogden, Aug. 16, 1993, Air Conditioning, Heating & Refrigeration News, pp. 17–19.

"Technician's Computer Program Shows the Birth of Innovation", W. J., Editor's Page, Aug. 30, 1993, Air Conditioning, Heating & Refrigeraiton news, p. 16.

*Primary Examiner*—Emanuel T. Voeltz
*Assistant Examiner*—M. Kemper
*Attorney, Agent, or Firm*—Kolisch, Hartwell, Dickinson, McCormack & Heuser

[57] ABSTRACT

Predictive maintenance method and apparatus for use with heating, ventilation, air-conditioning and/or refrigeration (HVACR) systems are disclosed. The preferred apparatus includes a dozen temperature sensors strategically located within and HVACR system to sense various operating temperatures and three electrical current sensors to sense various operating electrical currents. HVACR system conditions are measured periodically by an on-site service technician and inputted to a computer that identifies and reports the potential trouble spots represented by out-of-range measurements. The computer is programmed to produce graphs, tables and prediction commentary.

26 Claims, 3 Drawing Sheets

METHOD AND APPARATUS FOR PREDICTIVE MAINTENANCE OF HVACR SYSTEMS

BACKGROUND

The present invention relates generally to heating, ventilation, air-conditioning and/or refrigeration (HVACR) systems. More particularly, the invention concerns automatic predictive maintenance method and apparatus for use with such systems.

When it is performed in accordance with a defined schedule, preventive maintenance of HVACR systems, and more particularly air conditioning and refrigeration systems, is time-consuming and costly. When preventive maintenance is not performed in accordance therewith, systems fail. Failures can occur at the worst possible time, and may result in significant economic loss, e.g. of inventory or equipment. The frequency with which preventive maintenance is performed is usually determined empirically and thus represents an actuarial approach that ignores equipment- or installation-specific requirements. Equipment maintenance based upon analytic concepts such as mean time between failures (MTBF) utilizes gross statistical averages that half the time fail themselves to achieve their failure-preventive purpose.

SUMMARY OF THE INVENTION

Against this backdrop, the present invention now will be summarized briefly. The invented method and apparatus involve predictive maintenance of HVACR systems whereby various critical operating conditions thereof are measured periodically by an on-site service technician and then are computer-analyzed. The apparatus, which may be characterized as an expert system, identifies and reports the potential trouble spots represented by measurements indicative of suspect subsystems or system components such as out-of-range measurements. The report includes historical and rife raw data assembled in a format that is easily read and understood by a qualified service technician who then can make a decision whether preventive maintenance is indicated.

Accordingly, the invented method and apparatus achieve true predictive maintenance whereby a component failure is predicted in advance of its probable failure so that system failure can be avoided. Preferably, the apparatus consists of approximately a dozen temperature sensors and three electrical current sensors, from which other system conditions (such as pressure) and performance statistics (such as output energy) may be derived. Such sensors, which may be strategically located within an HVACR system to sense temperatures, may sense the temperatures of the suction line, the evaporator, the supply and return air, ambient and condenser air-water, liquid refrigerant and evaporator and condenser motor. Additional conditions such as compressor and evaporator motor current also may be sensed. The computer is equipped to produce a report including graphs, tables and predictive maintenance instructions such as "CHECK CONDENSER COIL", "CHECK REFRIGERANT CHARGE", etc. The invented method and apparatus achieve their predicted maintenance goal at extremely low cost and without adverse environmental impact.

DETAILED DESCRIPTION OF THE PREFERRED EMBODIMENT

Figure 1:
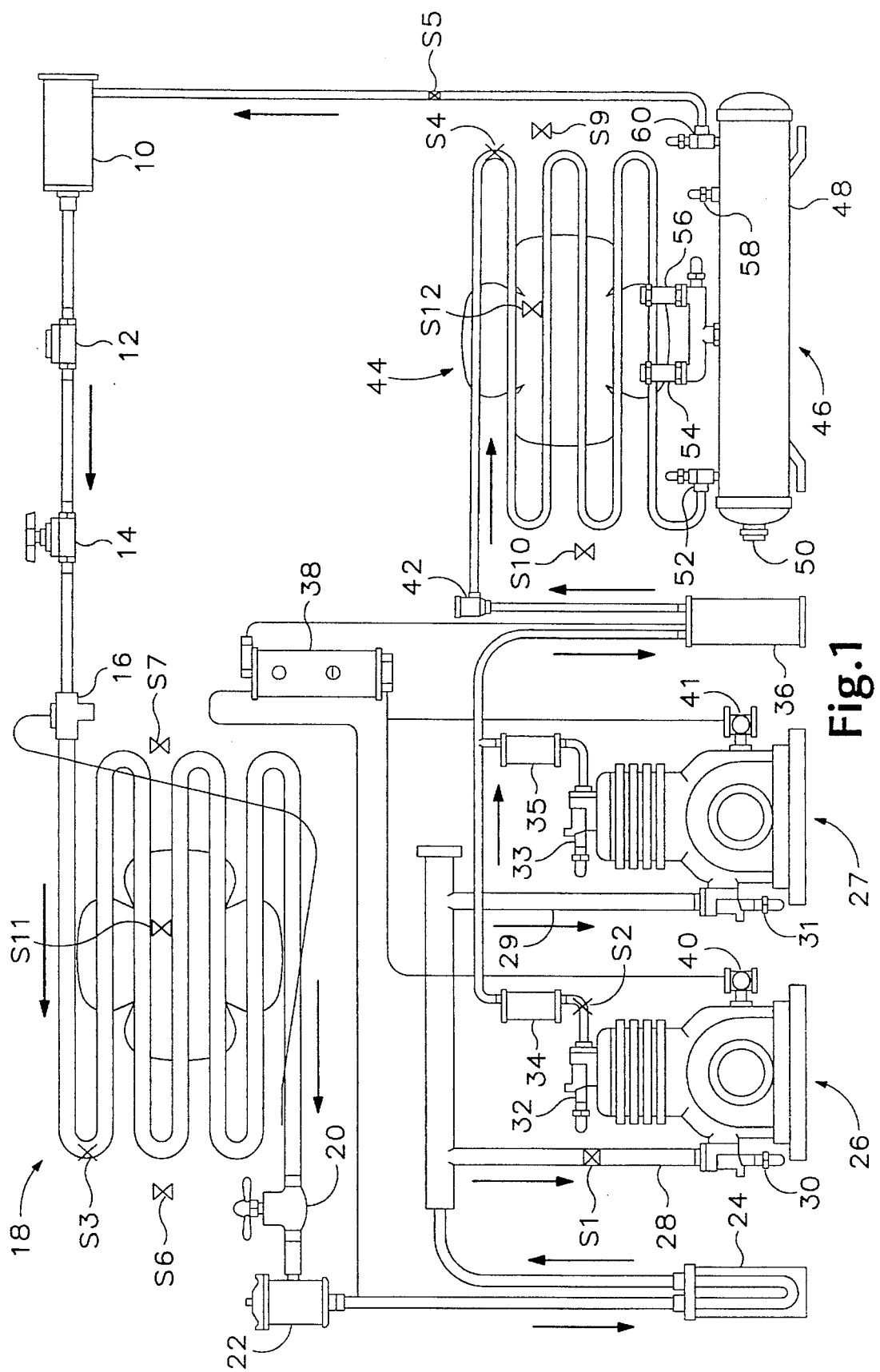
FIG. 1 is a diagram of a HVACR system showing preferred locations of installation of sensors according to a preferred embodiment of the invention.

Referring to FIG. 1, a typical HVACR system will now be described. It will be appreciated by those skilled in the art that a fluid such as one used as a refrigerant undergoes a number of state changes as it flows through the HVACR system components, e.g. it may pass through hot gas, liquid, vapor and even saturated vapor states at times. Thus, fluid herein is not limited to a fluid in its liquid state, but instead is used broadly to refer to any and all such phases and their combination. The system has been shown with its air path "unfolded" for conceptual clarity.

Refrigerant fluid flows through replaceable-core filter-dryer 10, to moisture-liquid indicator 12, to diaphragm packless valve 14, to thermostatic expansion valve 16, to evaporator subsystem 18. The flow path exits the evaporator subsystem 18 at wing cap packed valve 20 and replaceable-core suction line filter 22. A power-sensing element for an expansion valve extends from thermostatic expansion valve 16 nearly to the wing cap packed valve 20, with the power-sensing element bypassing the evaporator subsystem 18. The flow path then continues through suction accumulator 24, from where the refrigerant fluid line leads the fluid to a compressor subsystem. In the HVACR system of FIG. 1, the compressor subsystem comprises two compressors 26, 27 arranged in parallel with respect to the flow path. The fluid can flow through either compressor 26 or compressor 27, guided in by the suction lines 28, 29. Oil enters compressor 26 at compressor service valve 30 and exits through compressor service valve 32. The line from compressor 26 continues through discharge muffler 34 and is joined with the exiting line from compressor 27 leading the refrigerant fluid into oil separator 36.

An oil reservoir 38 is connected by separate oil lines to the replaceable-core suction line filter 22, an oil level regulator 40 of compressor 26, an oil level regulator 41 of compressor 27, and with oil separator 36.

The refrigerant fluid path continues from oil separator 36 to a check valve 42 to a condenser subsystem 44 and then to a receiver subsystem 46. Receiver subsystem 46 comprises a receiver tank 48 which has liquid level indicators 50, a receiver valve 52, three-way dual relief valves 54, 56 connected into a portion of the fluid path line that is still within the condenser subsystem 44, a charging and purging valve 58, and a receiver valve 60. The flow of the refrigerant fluid continues from receiver valve 60 back into replaceable-core filter-dryer 10.

Preferred sensor locations and purpose are as shown in FIG. 1. The sensors are preferably installed permanently in the HVACR system. The permanence of the installation avoids the adverse environmental impact of refrigerant fluid escaping into the atmosphere each time a sensor is disconnected or reconnected. Additionally, it makes practicing the method of the present invention more practical.

Suction temperature sensor S1, located near compressor 26 on suction line 28 is used to measure superheat and check system charge.

Discharge temperature sensor S2 is located after the compressor service valve 32 of compressor 26.

Evaporator temperature sensor S3, located at or near the first U-bend of the evaporator 18, helps determine suction pressure and refrigerant fluid charge.

Condensing temperature sensor S4 is located at or near the first U-bend of the condenser coil of condenser subsystem 44, and helps determine the discharge pressure and condenser operation.

Liquid line temperature sensor S5, located on the liquid line after the condenser, measures the liquid refrigerant temperature.

Supply air temperature sensor S6, located in the supply airstream, measures supply air temperature and evaporator temperature differences.

Return air temperature sensor S7 is located in the return airstream, to measure return air and evaporator temperature differences.

Ambient air temperature sensor S8 (not shown) is located any suitable place outside the controlled environment, e.g. it may be located outside the condenser or evaporator and measures ambient air thereinto.

Ambient air or water inlet temperature sensor S9 is located at the air or water inlet of the condenser subsystem 44, and measures condenser inlet media temperature.

Condenser air-water temperature sensor S10 is located at the condenser outlet, in the airstream, or on the water line of condenser subsystem 44. It measures the condensing media outlet temperature.

Evaporator motor temperature sensor S11 is located on the housing of the evaporator motor.

Condenser motor temperature sensor S12 is located on the housing of the condenser motor.

Compressor amperage sensor S13 is located on one of the compressor leads of compressor 26.

Condenser motor amperage sensor S14 is located on one of the motor leads of the condenser fan condenser subsystem 44.

Evaporator motor amperage sensor S15 is located on one of the evaporator leads of the evaporator fan of evaporator subsystem 18.

It will be understood by a person skilled in the art that other sensor configurations can be used advantageously.

Figure 2:
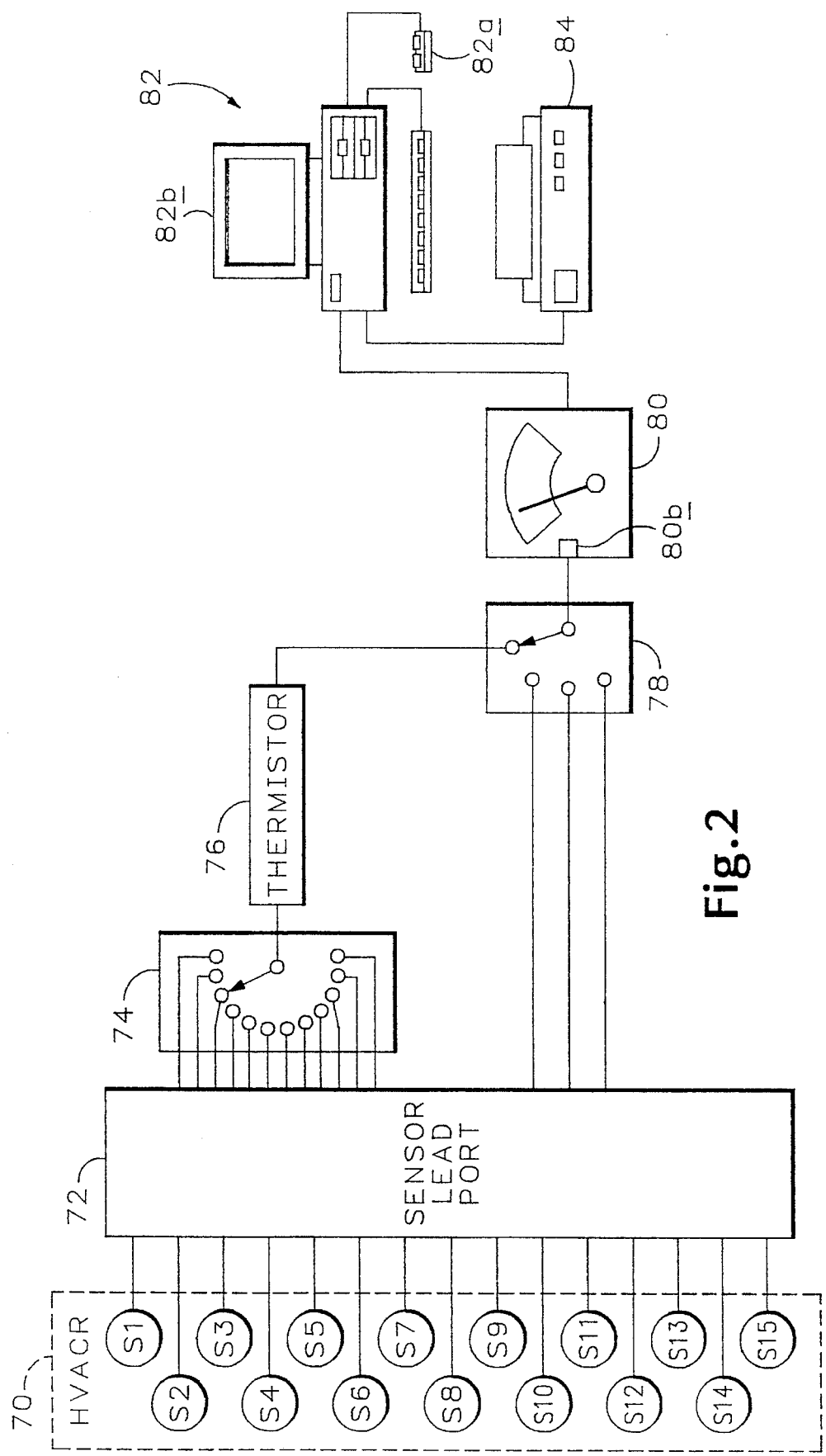
FIG. 2 is a block diagram of the predictive maintenance apparatus made in accordance with a preferred embodiment of the invention.

Referring to FIG. 2, the invented predictive maintenance apparatus in its preferred embodiment is generally indicated. Box 70 contains a HVACR system (also designated as System Under Test such as the HVACR system of FIG. 1) and the sensors S1, . . . , S15. The sensors S1, . . . , S15 are preferably connected through leads to a Sensor Lead Port 72 mounted on the HVACR system 70 that is accessible to a maintenance technician. The apparatus may have two Sensor Lead Ports, one for the leads of the temperature sensors and one for the leads of the electrical sensors.

The apparatus may be seen to include a portable multimeter 80 having the ability to sense temperature using, for example, a thermistor 76, a demultiplexer 74 capable of switching any one of n temperature sensor inputs (indicated generally at 16) such as S1, S2, S3 and Sn to the single output compatible with the multimeter's input jack 80b, and electrical variables from direct wire leads.

Optionally, a second demultiplexer 78 may interpose thermistor 76 and multimeter 80, as shown in FIG. 2. One or more of the inputs to second demultiplexer 78 are corresponding to one or more outputs of thermistor 76 and one or more other inputs to demultiplexer 78 are corresponding to one or more sensor lead port 72 outputs that need no conversion but instead represent raw electrical characteristics such as voltage, current or impedance that are measurable directly, i.e. without conversion from one form to another, by multimeter 80. Other multiplexer configurations can be envisioned to facilitate and/or automate data gathering.

The apparatus may be seen to include further a computer 82 equipped with a resident memory, mouse pointer subsystem 82a and output means, such as a video monitor 82b. Optionally, a printer 84 may be connected with computer 82, as is known. The computer has input/output means to enter data and to edit data stored in its memory. The computer also has software designed to implement the method of this invention. The software presents means for editing default values for threshold parameters and system performance data. The software allows optionally the use of actual, measured data as default values.

A method according to the present invention will now be described. The preferred way of practicing the method of the preferred invention is by custom software contained in the computer of the apparatus shown in FIG. 2.

Figure 3:
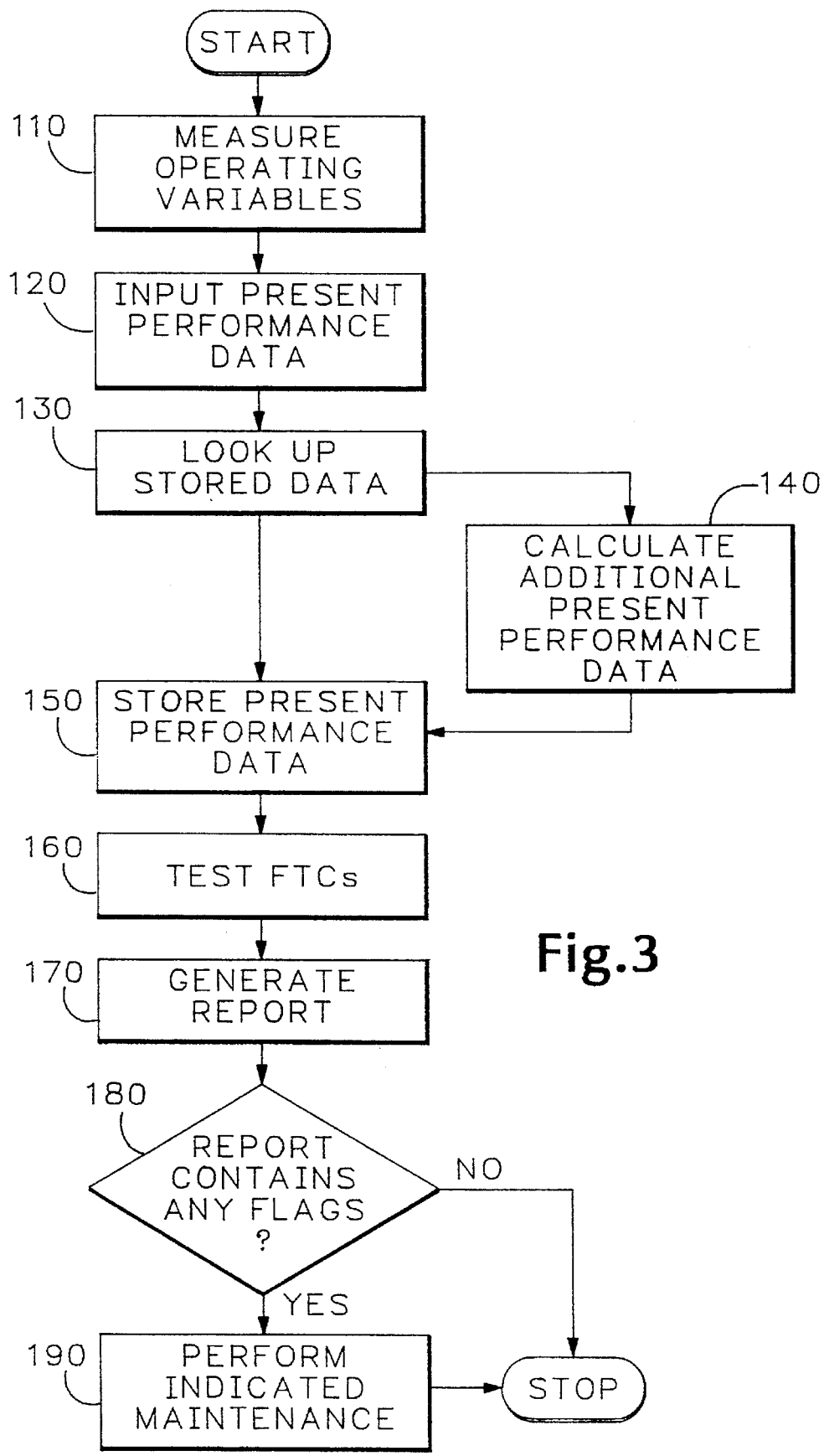
FIG. 3 is a high-level flowchart illustrating the predictive maintenance method by which a computer analyzes and organizes data and interfaces with a service technician.

As can be seen from FIG. 3, in step 110, operating variables of the HVACR system are measured. In a preferred embodiment of the invention, fifteen sensors S1, S2, . . . , S15 measure the values of fifteen operating variables of the HVACR system. These operating variables are assigned ordinal numbers from 1 to 15, respectively. The values of these operating variables constitute present performance data of the HVACR system in question.

In step 120 of the invention, the present performance data measured by the sensors is input to the computer. This way the values of the operating variables of the HVACR system have been inputted to the memory of the computer.

In step 130 of the method of the present invention, stored data in the memory of the computer are looked up. Stored data can be either previous performance data of the same HVACR system, or nominal, rated operating values for the various components of the system, or information to generate enthalpy charts, or the enthalpy charts themselves, or pressure-temperature diagrams or charts (or equations describing such), as the case may be. Stored data may also be threshold parameter values, as will be explained below. Different sets of present performance data and stored data will be used for different flag trigger conditions (FTCs).

The calculation of some flag trigger conditions requires the additional step 140. According to step 140 of the method of the present invention, additional present performance data is calculated based on the measured values from the sensors. Such reflect system performance statistics. A statistic is an operational relationship between two or more variables. More insightful information about the HVACR system in question is thus obtained.

Present performance data is stored according to step 150 in the memory of the computer for future use. This present performance data comprises defined HVACR system parameters and includes the measured data from the sensors and, according to a preferred embodiment of this invention, the additional present performance data that was calculated based upon the measured present performance data. Also initial system data corresponding to nominal system performance may be stored in the memory of the computer according to step 150 of the method of the present invention. Further, all stored system data corresponding to system performance may be edited according to step 150 of the method of the present invention.

According to step 160 of the present invention, preferred flag trigger conditions shown in Table I are checked as follows: specified flag trigger statistics are formed using present performance data (measured and optionally calculated according to step 140) and looked-up, stored data. Threshold parameters are also looked up, as stored data. Each threshold parameter corresponds to a flag trigger statistic. The specific data used for each flag trigger condition and statistic (i.e. the values of which measured, calculated, or stored variables) have been preselected, and comprise a key part of the present invention. The flag trigger condition tests whether the flag trigger statistic in each case is sufficiently closely correlated to its corresponding threshold parameter. In other terms, the flag trigger conditions are preselected correlations between measured data and stored data.

In the preferred embodiment of this invention, the flag trigger statistic is checked to determine whether it is larger than its corresponding threshold parameter in the form of an inequality, shown in Table I. The flag trigger statistics are shown as the lefthand side of the inequalities, and the corresponding threshold parameters are shown as the right hand side of the inequalities of Table I.

A specific flag trigger condition is generically denoted as FFCn, where n is a preferred ordinal number. Typically (but not always), a flag trigger statistic is formed by a difference between a present value of performance data or system performance statistic minus the prior or previous value or values of the same performance data or system performance statistic. The reader will readily recognize that the shown flag trigger statistics could be rewritten differently, with expressions that produce more expedient calculations. However, full formulae are given in Table I for conceptual clarity.

Preferred values for temperature threshold parameters (denoted as T-parameter) are typically in the range of 7°–24° F. Preferred values for electrical current threshold parameters (denoted as I-parameter) are typically in the 10% range. Preferred values for energy threshold parameters (denoted as E-parameter) are 10%. Preferred values for compression ratio threshold parameters (denoted as P-parameter) are 10%. In all cases, the invention determines whether the correlation is sufficiently high, e.g. whether the measured variable is within the defined range of the stored parameter, and if it is not then the user of the invented method or apparatus is instructed to perform predictive maintenance to remedy a perceived out-of-tolerance system component or performance criterion. Within the spirit and scope of the invention, the apparatus automatically may measure such a system variable and automatically may perform the remedial action, e.g. via robotic or other automatic controls.

In a situation where the flag trigger statistic is not sufficiently highly correlated to the threshold parameter, (in other words, where a correlation fails) a corresponding flag preferably is raised. Table I lists the flag trigger conditions, how they are calculated, and what flag number(s) they raise. The possible flags are preferably identified by flag numbers, numbering 1–13. Table II is a look up table resident in the memory of the computer where every prediction flag number corresponds to one preventive maintenance instruction.

In the memory of the computer there is a look-up table (or look up table) with flag trigger condition entries and maintenance instruction entries. When the correlation of a flag trigger condition is low, i.e. it fails to be sufficiently high, the corresponding entry of the look up table is addressed, thereby causing the corresponding set of maintenance instructions to be outputted on the output device of the computer. The look up table achieves the relationship of every flag trigger condition pointing to one or more predictive maintenance instructions.

According to step 170 of the method of the present invention, a report is generated. The report optionally includes data measured, data calculated, stored data, etc. The report includes those maintenance instructions pointed to by the flag numbers of the flags raised by flag trigger conditions where the flag trigger statistic was not sufficiently highly correlated to its corresponding threshold parameter.

It is not necessary that the report be printed. The report might be simply a display on a computer screen, or with other means of communication, e.g. via a modem, from the computer to the intended user. The user would be a maintenance technician for the HVACR system. By being an expert system, the present invention allows a nonexpert user to maintain the HVACR system with the expert knowledge and analysis afforded by the apparatus and method of the present invention.

According to an alternative method of another embodiment of the present invention, after the steps outlined above, the user queries the report for maintenance instructions, according to step 180. If there are such instructions, according to step 190 of the alternative embodiment of the present invention, the user performs the maintenance indicated by the maintenance instructions.

The predictive maintenance of the present invention is meant to be performed periodically. Every time a HVACR technician performs predictive maintenance according to the method of the present invention, the newly measured data and calculated data (i.e. present performance statistics) become stored data (e.g. system parameters) that may be used the next time the maintenance technician performs predictive maintenance.

Tabulated below are the preferred FTCs. The ordinal numbers of the FTCs appear in the left column, the inequality formulae and threshold conditions appear in the center column and the possible prediction flags appear in the right column.

TABLE I

| FTC Number | Flag Trigger Condition | Prediction Flag Numbers |
|---|---|---|
| FTC 1 | Present [(Suction_tmp) − (Evaporator_tmp)] − Previous [(Suction_tmp) − (Evaporator_tmp)] > [T-parameter] | 1, 8, 9 |
| FTC 2 | Present [(Discharge_tmp − Ambient_air_tmp) − (Condensing_tmp − Ambient_air_tmp)] − Previous [(Discharge_tmp − Ambient_air_tmp) − (Condensing_tmp − Ambient_air_tmp)] > [T-parameter] | 1, 5, 10 |
| FTC 3 | Present [Evaporator_tmp] − | 1, 5, 9 |

TABLE I-continued

| FTC Number | Flag Trigger Condition | Prediction Flag Numbers |
|---|---|---|
| | Previous [Evaporator_tmp] > [T-parameter] | |
| FTC 4 | not used | |
| FTC 5 | Present [(Cond_Media_in_tmp − Ambient_air_tmp) − (Liquid_line_tmp − Ambient_air_tmp)] − Previous [(Cond_Media_in_tmp − Ambient_air_tmp) − (Liquid_line_tmp − Ambient_air_tmp)] > [T-parameter] | 6, 10 |
| FTC 6 | Present [Supply_air_tmp] − Previous [Supply_air_tmp] > [T-parameter] | 1, 7, 8, 9, 10 |
| FTC 7 | Present [Return_air_tmp] − Previous [Return_air_tmp] > [T-parameter] | 1, 7, 8, 9, 10 |
| FTC 8 | not used | |
| FTC 9 | not used | |
| FTC 10 | Present [(Cond_Media_out_tmp − Ambient_air_tmp) − (Cond_Media_in_tmp − Ambient_air_tmp)] − Previous [(Cond_Media_out_tmp − Ambient_air_tmp) − (Cond_Media_in_tmp − Ambient_air_tmp)] > [T-parameter] | 10 |
| FTC 11 | Present [(Evaporator_mtr_tmp) − (Supply_air_tmp)] − Previous [(Evaporator_mtr_tmp) − (Supply_air_tmp)] > [T-parameter] | 7, 9, 11 |
| FTC 12 | Present [(Condenser_mtr_tmp − Ambient_air_tmp) − (Cond_Media_out_tmp − Ambient_air_tmp)] − Previous [(Condenser_mtr_tmp − Ambient_air_tmp) − (Cond_Media_out_tmp − Ambient_air_tmp)] > [T-parameter] | 6, 11 |
| FTC 13 | Compressor_amp /rated_compressor_amp > [I-parameter] | 3, 4, 8, 11 |
| FTC 14 | Condenser_mtr_amp /rated_condenser_mtr_amp > [I-parameter] | 3, 4, 6, 11 |
| FTC 15 | Evaporator_mtr_amp /rated_evaporator_mtr_amp > [I-parameter] | 3, 4, 7, 11 |
| FTC 16 | not used | |
| FTC 17 | not used | |
| FTC 18 | Present [Super_heat − Ambient_air_tmp] − Previous [Super_heat − Ambient_air_tmp] > [T-parameter] | 5 |
| FTC 19 | Present [Subcooling − Ambient_air_tmp] − Previous [Subcooling − Ambient_air_tmp] > [T-parameter] | 1, 7 |
| FTC 20 | Present [Comp_tmp_diff − Ambient_air_tmp] − Previous [Comp_tmp_diff − Ambient_air_tmp] > [T-parameter] | 1, 4, 6, 8, 11 |
| FTC 21 | Present [Evap_tmp_diff] − Previous [Evap_tmp_diff] > [T-parameter] | 2 |
| FTC 22 | Present [Cond_tmp_diff − Ambient_air_tmp] − Previous [Cond_tmp_diff − Ambient_air_tmp] > [T-parameter] | 2, 6, 10 |
| FTC 23 | Present [Heat_of_compression − Ambient_air_tmp] − Previous [Heat_of_compression − Ambient_air_tmp] > [T-parameter] | 1, 5, 6, 10, 13 |
| FTC 24 | Present [Compression_ratio] /Previous [Compression_ratio] > [P-parameter] | 1, 5, 6, 10, 13 |
| FTC 25 | not used | |
| FTC 26 | not used | |
| FTC 27 | Present [BTU/lb_rmvd_evap] − Previous [BTU/lb_rmvd_evap] > [E-parameter] | 1, 2, 5, 7, 12 |
| FTC 28 | Present [BTU/lb_rmvd_cond] − Previous [BTU/lb_rmvd_cond] > [E-parameter] | 1, 5, 6, 10, 12 |
| FTC 29 | not used | |
| FTC 30 | not used | |
| FTC 31 | Previous [Evaporator_tmp] − Present [Evaporator_tmp] > [T-parameter] | 2, 7, 9 |
| FTC 32 | Previous [Liquid_line_tmp − Ambient_air_tmp] − Present [Liquid_line_tmp − Ambient_air_tmp] > [T-parameter] | 1, 2 |
| FTC 33 | Previous [Supply_air_tmp] − Present [Supply_air_tmp] > [T-parameter] | 2, 9 |
| FTC 34 | Previous [Super_heat − Ambient_air_tmp] − Present [Super_heat − Ambient_air_tmp] > [T-parameter] | 2, 7 |
| FTC 35 | Previous [Subcooling − | 2, 6, 10 |

TABLE I-continued

| FTC Number | Flag Trigger Condition | Prediction Flag Numbers |
|---|---|---|
| | Ambient_air_tmp] – Present [Subcooling – Ambient_air_tmp] > [T-parameter] | |

The prediction flags that are listed above in Table I are defined below in Table II.

TABLE II

| Flag Number | Definition |
|---|---|
| 1 | Possible refrigerant leak |
| 2 | Possible restricted airflow |
| 3 | Possible low voltage situation |
| 4 | Possible starter failure |
| 5 | Possible expansion device failure |
| 6 | Possible condenser motor failure |
| 7 | Possible evaporator motor failure |
| 8 | Possible compressor motor failure |
| 9 | Thermostat may be out of adjustment |
| 10 | Possible condenser failure |
| 11 | Possible motor bearing lubrication required |
| 12 | Possible bad compressor valves |
| 13 | Possible system overcharge |

Further to Table I and Table II, the following are definitions of terms used therein:

Suction_tmp is a suction temperature in degrees Fahrenheit (°F.).

Discharge_tmp is discharge temperature in degrees Fahrenheit (°F.).

Evaporator_tmp is an evaporator temperature in degrees Fahrenheit (°F.).

Condensing_tmp is a condenser temperature in degrees Fahrenheit (°F.).

Liquid_line_tmp is a temperature at a liquid line of the HVACR in degrees Fahrenheit (°F.).

Supply_air_tmp is a supply air temperature in degrees Fahrenheit (°F.).

Return_air_tmp is a return air temperature in degrees Fahrenheit (°F.).

Ambient_air_tmp is an ambient air temperature in degrees Fahrenheit (°F.).

Cond._Media_in_tmp is a condensing media In temperature in degrees Fahrenheit (°F.).

Cond_Media_out_tmp is a condenser media Out temperature in degrees Fahrenheit (°F.).

Evaporator_mtr_tmp is an evaporator motor temperature in degrees Fahrenheit (°F.).

Condenser_mtr_tmp is a condenser motor temperature in degrees Fahrenheit (°F.).

Compressor_amp is a compressor electric current, also called amperage, in Amperes.

Condenser_mtr_amp is a condenser motor amperage in Amperes.

Evaporator_mtr_amp is evaporator motor amperage, in Amperes.

Suction_pres.(PSIG) is a suction pressure in pound per square inch (where the G stands for gauge).

Dischg_Pres.(PSIG) is a discharge pressure in pounds per square inch.

Super_heat is a superheat temperature in degrees Fahrenheit (°F.).

Subcooling is a subcooling temperature in degrees Fahrenheit (°F.).

Comp._tmp_diff is a compressor temperature difference in degrees Fahrenheit (°F.).

Evap._tmp_diff is an evaporator temperature difference in degrees Fahrenheit (°F.).

Cond._tmp_diff is a condenser temperature difference in degrees Fahrenheit (°F.).

Heat_of_compression is a heat of compression in degrees Fahrenheit (°F.).

Compression_ratio is a compression ratio that is unitless.

Suction_pres. (abs) is an absolute suction pressure (i.e. gauge pressure+atmospheric pressure (14.7 psi)), in pounds per square inch.

Dischg._pres. (abs) is an absolute discharge pressure in pounds per square inch.

Compressor_RLA_Dev is a percentage deviation in compressor motor amperage from the rated value, where RLA stands for running load amps.

Cond._mtr_RLA_Dev is a percentage deviation in condenser motor amperage from the rated value.

Evap._mtr_RLA_Dev is a percentage deviation in evaporator motor amperage from the rated value.

Cost/Hr (unit amp) is a cost per hour of electrical energy.

Cost/Hr (output) is the cost per hour of heat energy ejected from by the condenser, and most readily is calculated by conversion from BTU to W, as cost typically is represented by cents/kW, not by cents/BTU.

% Comp._rated_amp is a percent difference of the present current consumption of the compressor motor compared to the nominal current consumption of the compressor motor.

% Evap._rated_amp is a percent difference of the present current consumption of the evaporator motor compared to the nominal current consumption of the evaporator motor.

% Cond._rated_amp is a percent difference of the present current consumption of the condenser motor compared to the nominal current consumption of the condenser motor.

% Unit_rtd_cap represents the energy removed by the evaporator relative to the rated capacity thereof. More specifically, it is a ratio between the BTUs per hour removed by the evaporator per pound of refrigerant fluid, times the rated pounds of refrigerant circulated in an hour and the rated capacity of the evaporator.

Evaporator_mtr_rise is an evaporator motor temperature rise in degrees Fahrenheit (°F.).

BTU/lb._rmvd-evap is BTUs per pound (energy) removed in the evaporator.

BTU/lb._rmvd-cond. is BTUs per pound (energy) removed in the condenser.

Watts_rmvd-evap is watts per pound (energy) removed in the evaporator.

Watts_rmvd-cond. is watts per pound (energy) removed in the condenser.

Values for these variables are measured or calculated, in accordance with the preferred method and apparatus of the invention, as follows below. It will be appreciated by those of skill in the art that, by the preferred method and apparatus of the invention, software executing in the processor of computer 82 executes the method illustrated in FIG. 3 to input data, look up previously stored data, optionally calculate additional data, store present performance data, test for certain conditions (FTCs) and generate a report to the user. If the result of testing the flag trigger conditions indicates the need for predictive maintenance on HVACR system under test 70, then the report so indicates, and the user complies. Alternative methods of performing the method steps, including firmware or even hardware-assisted or fully automated measurement, inputting, looking up, calculating, storing, testing and reporting steps are within the spirit and scope of the invention.

For proper operation of the software and a comprehensive report, the user is requested to input the following information initially: Company Name, Equipment, Manufacturer, Model Number, Serial Number, Unit Number, Unit Voltage, Price Per Kilowatt Hour (cents), Compressor Phrase, Condenser Motor Phrase, Evaporator Motor Phrase, Unit Rated Amperage, Compressor Amperage, Evaporator Fan Amperage, Condenser Fan Amperage, Circ. Pump Amperages, Heater Amperages, Condenser Location, Evaporator Location, Condenser Type, Evaporator Type, Compressor Type, Refrigerant Type, Filter Amount, Filter Size, Compressor, Outdoor Fan Motor, Heating Relay, and Low Pressure Control. Such data are gathered by conventional input/output means that may include a graphical user interface (GUI).

A listing of variables that may be displayed follows, although it will be appreciated that more or fewer, or different, variables may be reported to the user by any suitable means including displaying, printing, or otherwise communicating. Not all variables are used for determining whether a flag should be raised. Those not used this way have value to a user in the report. The variables have been assigned ordinal numbers from 1–80 for their better and more consistent organization in a final report. As mentioned before, the first fifteen variables contain values measured from the sensors. More specifically:

1. Suction_tmp is measured by sensor S1.
2. Discharge_tmp is measured by sensor S2.
3. Evaporator_tmp is measured by sensor S3.
4. Condensing_tmp is measured by sensor S4.
5. Liquid_line_tmp is measured by sensor S5.
6. Supply_air_tmp is measured by sensor S6.
7. Return_air_tmp is measured by sensor S7.
8. Ambient_air_tmp is measured by sensor S8.
9. Cond_Media_in_tmp is measured by sensor S9.
10. Cond_Media_out_tmp is measured by sensor S10.
11. Evaporator_mtr_tmp is measured by sensor S11.
12. Condenser_mtr_tmp is measured by sensor S12.
13. Compressor_amp is measured by sensor S13.
14. Condenser_mtr_amp is measured by sensor S14.
15. Evaporator_mtr_amp is measured by sensor S15.

The remaining variables are calculated by using stored data. For the next two variables, stored data is a pressure-temperature chart or diagram. Such charts may be thought of as formulae stored in memory representing as many different characteristic pressure-temperature curves as there are different refrigerants, such curves being specified by manufactures or test laboratories. These characteristic curves or formulae are used by the software, along with measured or sensed operating variables as described above, to create an enthalpy diagram that describes the operation of HVACR system under test 70.

16. Suction_pres.(PSIG) is a suction pressure and is looked up from the pressure-temperature diagram. The suction temperature (variable #1) produces a suction pressure, from the pressure-temperature diagram.

17. Dischg_Pres.(PSIG) is a discharge pressure which is looked up from the pressure-temperature diagram the discharge temperature (variable #2).

Additional statistics are calculated by combining one or more of the measured variables.

18. Super_heat is a super heat variable calculated as a difference between the suction temperature (variable #1) minus the evaporator temperature (variable #3).

19. Subcooling is a subcooling variable that is calculated as the difference between the condensing temperature (variable #4) minus the liquid line temperature (variable #5).

20. Comp._tmp_diff is a compressor temperature difference calculated as the discharge temperature (variable #2) minus the suction temperature (variable #1).

21. Evap._tmp_diff is an evaporator temperature difference calculated as a difference between the return air temperature (variable #7) minus the supply air temperature (variable #6).

22. Cond._tmp_diff is a condenser temperature difference calculated as a difference between the condenser media out temperature (variable #10) minus the condenser media in temperature (variable #9).

23. Heat_of_compression is a heat of compression, calculated as a difference between the discharge temperature (variable #2) minus the suction temperature (variable #1).

24. Compression_ratio is a compression ratio calculated as the absolute discharge pressure (variable #26) divided by the absolute suction pressure (variable #25), both calculated in subsequent steps.

25. Suction_pres. (abs) is an absolute suction pressure calculated as the suction pressure (variable #16) plus 14.7.

26. Dischg._pres. (abs) is an absolute discharge pressure, calculated as the discharge pressure (variable #17) plus 14.7.

Other statistics are calculated with reference to stored data, wherein stored data are nominal, rated values of the equipment, often shown on the equipment itself, on what might be called a nomenclature plate or boilerplate.

27. Compressor_RLA_Dev is a deviation in compressor motor amperage from the rated value, and is calculated as a ratio of the difference between the actual compressor motor amperage and the rated compressor motor amperage to the rated compressor motor amperage.

28. Cond._mtr_RLA_Dev is a deviation in condenser motor amperage from the rated value, and is calculated as a ratio of the difference between the actual condenser motor amperage (variable #4) and the rated condenser motor amperage to the rated condenser motor amperage.

29. Evap._mtr_RLA_Dev is a deviation in evaporator motor amperage from the rated value, and is calculated as a ratio of the difference between the actual evaporator motor amperage (variable #3) and the rated evaporator motor amperage to the rated evaporator motor amperage.

Other statistics are calculated with reference to stored data, wherein stored data are operating values of the system, such as the voltage, the number of phases, and initially input data such as the cost of electrical energy.

30. Cost/Hr (unit amp) is a cost per hour calculated as the sum of all current measurements (variables #13 plus variable #14 plus variable #15) times the voltage (to derive an electrical power) multiplied by a cost per kilowatt.

31. Cost/Hr (output) is a cost per hour calculation of the energy expelled at the condenser, and may be calculated by converting BTUs so expelled to watts and then by multiplying the wattage by the unit cost per watt.

32. % Comp._rated_amp is a deviation in compressor motor electrical current or amperage from the rated value, and is calculated as a ratio of the difference of the actual compressor motor amperage (variable #13) minus the rated amperage over the rated amperage.

33. % Evap._rated_amp is a deviation in evaporator motor amperage from the rated value, and is calculated as a ratio of the difference of the actual compressor motor amperage (variable #15) minus the rated amperage over the rated amperage.

34. % Cond._rated_amp is a deviation in condenser motor amperage from the rated value, and is calculated as a ratio of the difference of the actual condenser motor amperage (variable #14) minus the rated amperage over the rated amperage.

35. % Unit_rtd_cap is a ratio between the BTUs per hour removed by the evaporator per pound of refrigerant fluid, times the rated pounds of refrigerant circulated in an hour and the rated capacity of the evaporator, and may be so calculated.

36. Evaporator_mtr_rise is a temperature difference of the evaporator motor calculated as the evaporator motor temperature (variable #11) minus the supply air temperature (variable #6).

Other statistics are calculated from the enthalpy diagram. The enthalpy diagrams that are available for viewing by the user in accordance with the preferred embodiment of the invention represent three overlapped (overlaid) diagrams representing a succession of two historic and one current enthalpy state of the HVACR system under test. The diagrams are created by the software based upon the present performance data, the looked-up, stored data and the stored temperature-pressure formulae or charts that characterize, for example, the cooling capacity, of various refrigerants that might be a part of the system under test. Thus, a less sophisticated user of the invented apparatus and method nevertheless is able to comprehend the operation of the system under test by viewing the created enthalpy diagrams, which may be seen to augment the reporting of predictive maintenance flags and their corresponding instructions. Essentially, the system enthalpy diagrams give the user a long view of the recent trends in the operation of the system under test.

37. BTU/lb._rmvd-evap is an energy per pound measurement of the heat energy removed from the air (or other conditioned media) by the evaporator, and is looked up from the enthalpy table.

38. BTU/lb._rmvd-cond. is an energy per pound measurement of the heat energy removed from the refrigerant by the condenser, and is looked up from the enthalpy table.

19. Watts_rmvd-evap is an energy per pound measurement of the heat energy removed from the air by the evaporator, and is calculated by BTU/lb._rmvd-evap (variable #37) divided by 3.4130.

20. Watts_rmvd-cond. is an energy per pound measurement of the heat energy removed from the refrigerant by the condenser, and is calculated by BTU/lb._rmvd-cond. (variable #38) divided by 3.4130.

Then differences are computed with respect to historical (previous) values of the same variables.

41. Suction_tmp_chg=Present(Suction_tmp)-Previous(Suction_tmp)

42. Discharge_tmp_chg=Present(Discharge_tmp)-Previous(Discharge_tmp)

43. Evaporator_tmp_chg=Present(Evaporator_tmp)-Previous(Evaporator_tmp)

44. Condensing_tmp_chg=Present(Condensing_tmp)-Previous(Condensing_tmp)

45. Liquid_line_tmp_chg=Present(Liquid_line_tmp)-Previous(Liquid_line_tmp)

46. Supply_air_tmp_chg=Present(Supply_air_tmp)-Previous(Supply_air_tmp)

47. Return_air_tmp_chg=Present(Return_air_tmp)-Previous(Return_air_tmp)

48. Ambient_air_tmp_chg=Present(Ambient_air_tmp)-Previous(Ambient_air_tmp)

49. Cond. Media_in_tmp_chg=Present(Cond. Media_in_tmp)-Previous(Cond. Media_in_tmp)

50. Media_out_tmp_chg=Present(Media_out_tmp)-Previous(Media_out_tmp)

51. Evaporator_mtr_tmp_chg=Present(Evaporator_mtr_tmp)-Previous(Evaporator_mtr_tmp)

52. Condenser_mtr_tmp_chg=Present(Condenser_mtr_tmp)-Previous(Condenser_mtr_tmp)

53. Compressor_amp_chg=Present(Compressor_amp)-Previous(Compressor_amp)

54. Condenser_mtr_amp_chg=Present(Condenser_mtr_amp)-Previous(Condenser_mtr_amp)

55. Evaporator_mtr_amp_chg=Present(Evaporator_mtr_amp)-Previous(Evaporator_mtr_amp)

56. Suction_pres.(PSIG)_chg=Present(Suction_pres.(PSIG))-Previous(Suction_pres.(PSIG))

57. Dischg_Pres.(PSIG)_chg=Present(Dischg_Pres.(PSIG))-Previous(Dischg_Pres.(PSIG))

58. Super_heat_chg=Present(Super_heat)-Previous(Super_heat)

59. Subcooling_chg=Present(Subcooling)-Previous(Subcooling)

60. Comp._tmp_diff_chg=Present(Comp._tmp_diff)-Previous(Comp._tmp_diff)

61. Evap._tmp_diff_chg=Present(Evap._tmp_diff)-Previous(Evap._tmp_diff)

62. Cond._tmp_diff_chg=Present(Cond._tmp_diff)-Previous(Cond._tmp_diff)

63. Heat_of_compression_chg=Present(Heat of compression)-Previous(Heat of compression)

64. Compression_ratio_chg=Present(Compression_ratio)-Previous(Compression_ratio)

65. Suction_pres. (abs)_chg=Present(Suction_pres. (abs))-Previous(Suction_pres. (abs))

66. Dischg._pres. (abs)_chg=Present(Dischg._pres. (abs))-Previous(Dischg._pres. (abs))

67. Compressor_RLA_Dev_chg=Present(Compressor_RLA_Dev)-Previous(Compressor_RLA_Dev)

68. Cond._mtr_RLA_Dev_chg=Present(Cond._mtr_RLA_Dev)-Previous(Cond._mtr_RLA_Dev)

69. Evap._mtr_RLA_Dev_chg=Present(Evap._mtr_RLA_Dev)-Previous(Evap._mtr_RLA_Dev)

70. Cost/Hr (unit amp)_chg=Present(Cost/Hr (unit amp))-Previous(Cost/Hr (unit amp)

71. Cost/Hr (output)__chg=Present(Cost/Hr (output))Previous(Cost/Hr (output))

72. % Comp._rated_amp_chg=Present(% Comp._rated_amp)-Previous(% Comp._rated_amp)

73. % Evap._rated_amp_chg=Present(% Evap._rated_amp)-Previous(% Evap._rated_amp)

74. % Cond._rated_amp_chg=Present(% Cond._rated_amp)-Previous(% Cond._rated_amp)

75. % Unit_rtd_cap_chg=Present(% Unit_rtd_cap)-Previous(% Unit_rtd_cap)

76. Evaporator_mtr_rise_chg=Present(Evaporator_mtr_rise)-Previous(Evaporator_mtr_rise)

77. BTU/lb._rmvd-evap_chg=Present(BTU/lb._rmvd-evap)-Previous(BTU/lb._rmvd-evap)

78. BTU/lb._rmvd-cond._chg=Present(BTU/lb._rmvd-cond.)-Previous(BTU/lb._rmvd-cond.)

79. Watts_rmvd-evap_chg=Present(Watts_rmvd-evap)-Previous(Watts_rmvd-evap)

80. Watts_rmvd-cond._chg=Present(Watts_rmvd-cond.)-Previous(Watts_rmvd-cond.)

Accordingly, a method and apparatus have been described for predictive maintenance of an HVACR system.

While the present invention has been shown and described with reference to the foregoing preferred embodiment, it will be apparent to those skilled in the art that other changes in form and detail may be made therein without departing from the spirit and scope of the invention as defined in the appended claims.

What is claimed is:

1. A computer-assisted method of performing predictive maintenance on a heating, ventilation, air-conditioning and/or refrigeration (HVACR) system, the method comprising the steps of:

storing a plurality of defined HVACR system parameters—in a memory location in the computer, such defined parameters including system temperature and system pressure parameters;

defining at least one preventive maintenance instruction;

storing said instruction(s) in a computer-accessible memory;

measuring a HVACR system variable which corresponds to at least one stored system parameter;

comparing the defined parameter with the system variable to assess whether the variable is sufficiently highly correlated with the system parameter:

responsive to said comparing, accessing at least one of said stored instructions if the system parameter and the measured variable are not sufficiently highly correlated; and displaying said accessed instruction(s) so that a user will understand the type of maintenance required.

2. The method of claim 1, wherein said first storing is of a system parameter that is predefined with one or more default values by a HVACR system maintenance expert.

3. The method of claim 2 which further comprises the step of adjusting the predefined system parameter in such manner that such default values are no longer in effect.

4. The method of claim 1, wherein said first storing is of a system parameter that is measured by a previously executed one of said measuring steps.

5. The method of claim 1, wherein said first storing is of a previously measured system variable, whereby the comparing is of a succession of measured HVACR system variables.

6. The method of claim 1 further comprising the step of calculating at least one additional system variable using a previously measured system variable.

7. The method of claim 1 which further comprises reporting to a user the measured system variable.

8. The method of claim 7 which further comprises the user maintaining the HVACR system in response to the indicating step.

9. The method of claim 8 which further comprises repeating said measuring, said comparing, said reporting and said maintaining steps.

10. The method of claim 9, wherein said repeating, measuring, comparing, reporting and maintaining steps are conducted at predefined intervals of time.

11. A computer assisted method for maintaining a heating, ventilation, air-conditioning and/or refrigeration (HVACR) system having at least one operating variable, the method comprising the steps of:

measuring at least one operating variable of the HVACR system to derive present performance data;

looking up stored data;

storing the present performance data;

generating a flag trigger statistic that includes preselected present performance data and stored data that corresponds to the preselected present performance data;

checking a flag trigger condition that points to at least one predictive maintenance instruction, wherein checking of the flag trigger condition is executed by comparing the flag trigger statistic with stored data that corresponds to the flag trigger statistic to determine whether the flag trigger statistic is sufficiently highly correlated with the stored data that corresponds to the flag trigger statistic; and if not then generating a report for a user that includes at least the predictive maintenance instruction pointed to by the flag trigger condition.

12. The method of claim 11, wherein the flag trigger statistic is represented a difference formed by subtracting from present performance data stored data that corresponds to performance data stored from a previously executed storing step.

13. The method of claim 11, wherein the operating variable is temperature.

14. The method of claim 11 which further comprises the step of the user maintaining the HVACR system according to the predictive maintenance instructions contained in the report.

15. The method of claim 11 further including the step of calculating at least one additional present performance data of the HVACR system using the measured present performance data.

16. The method of claim 15, wherein the operating variable is temperature.

17. The method of claim 15, wherein the operating variable is electrical current.

18. The method of claim 15, wherein the additional present performance data is temperature.

19. The method of claim 15, wherein the additional present performance data is pressure.

20. The method of claim 15, wherein the additional present performance data is energy.

21. The method of claim 15 which further comprises the step of performing maintenance on the HVACR system according to the predictive maintenance instructions contained in the report.

22. A computerized apparatus for generating predictive maintenance instructions for a heating, ventilation, air-conditioning and/or refrigeration (HVACR) system comprising:

at least one sensor for sensing a variable of the HVACR system;

a meter operatively coupled to the sensor, the meter capable of producing an output sample corresponding to a value of the variable sensed by the sensor;

a special purpose computer operatively coupled to the meter and capable of inputting the output sample produced by the meter, the computer having an output device, a memory for storing data, and a look-up table stored in the memory, the look-up table having flag trigger condition entries that correspond to preselected correlations between measured data and stored data, the look-up table further having sets of maintenance instructions entries corresponding to the flag trigger condition entries, the computer being capable of making calculations, the preselected correlations between measured data and stored data, and decisions as to whether the HVACR system requires maintenance based upon the correlations, and, if a specific correlation fails, the corresponding flag trigger condition of the look-up table being addressed, thereby to cause the corresponding set of maintenance instructions to be outputted on the output device.

23. The apparatus of claim 22 wherein there are plural ones of said sensors, and wherein said sensors are permanently installed in the HVACR system.

24. The apparatus of claim 23 wherein said sensors have leads that terminate in a sensor lead port accessible to a user.

25. The apparatus of claim 24 wherein the meter is a portable multimeter.

26. The apparatus of claim 25 wherein the multimeter is coupled to the sensor using a thermocoupling converter for converting a temperature signal to an electrical signal compatible as input to the multimeter.

* * * * *